March 8, 1932. J. C. BLAIR 1,848,154
PROCESS AND APPARATUS FOR THE MANUFACTURE OF SHEET GLASS
Filed Sept. 18, 1929
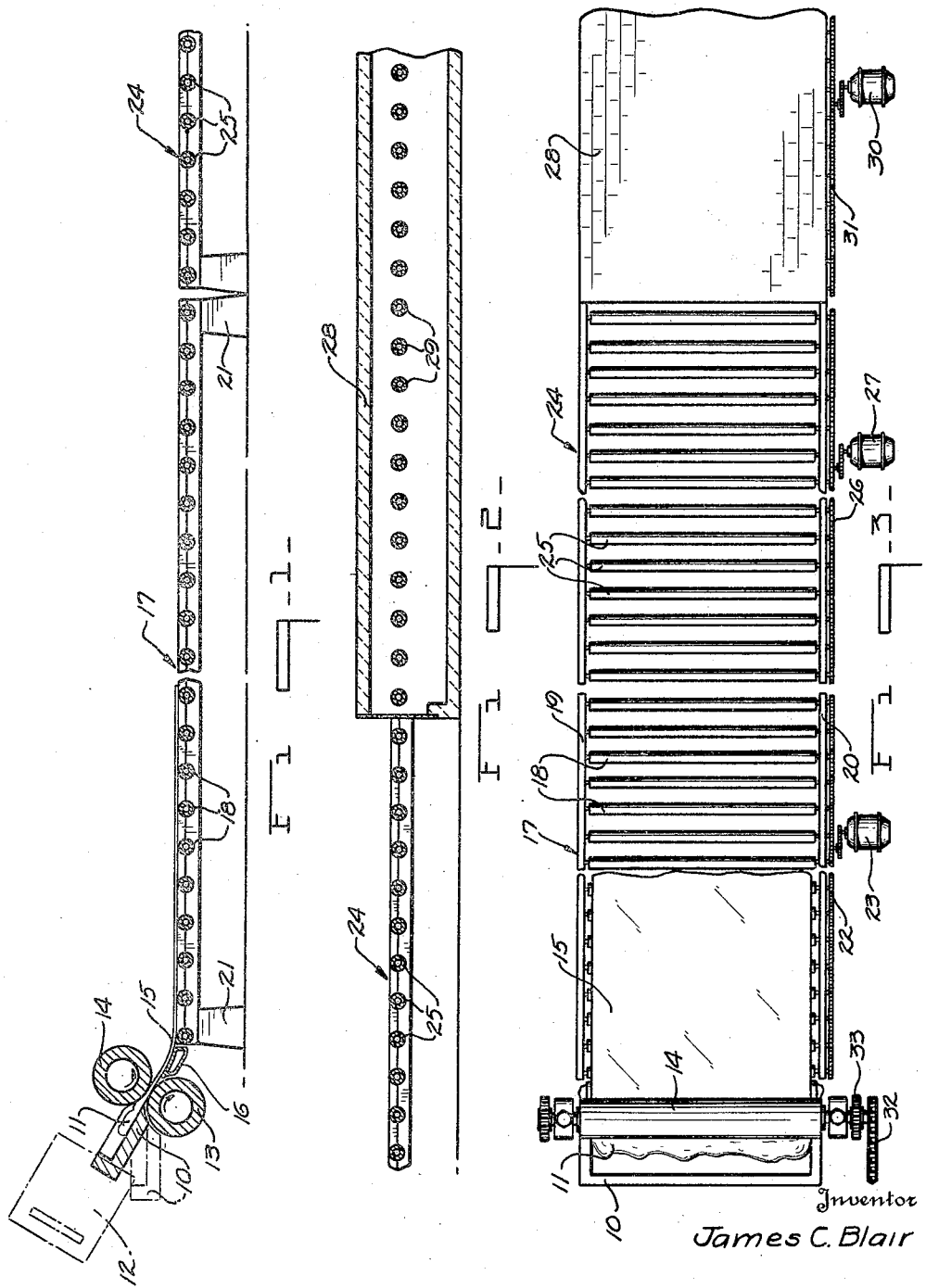
Inventor
James C. Blair
By Frank Fraser
Attorney Patented Mar. 8, 1932

1,848,154

UNITED STATES PATENT OFFICE

JAMES C. BLAIR, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR THE MANUFACTURE OF SHEET GLASS

Application filed September 18, 1929. Serial No. 393,539.

This invention relates broadly to the manufacture of sheet glass and more particularly to a process of and apparatus for the manufacture of glass sheets by an intermittent forming operation.

In the production of sheet glass according to one process, a plurality of successive sheets are intermittently rolled at predetermined intervals from a series of charges of molten glass. The molten glass is preferably melted and refined within a suitable receptacle or pot and poured therefrom onto a receiver from where it is moved to and passed between a pair of forming rolls which function to reduce the glass to a sheet of substantially predetermined and uniform thickness. In the process just described, it is desirable that the molten glass passing to the forming rolls be rapidly reduced thereby to sheet form so as not to adversely affect the quality of the glass and also in order to speed up production. While it is expedient to reduce the molten glass rapidly to sheet form, it is not necessary that the glass be annealed while traveling at this same high rate of speed and in fact such as undesirable for the reason that in such event, the length of annealing leer necessary would have to be exceedingly long. For example, were the glass rolled to sheet form at the rate of sixty feet per minute and should it require sixty minutes to anneal the glass, it will be seen that the leer necessary would have to be 3600 feet in length. The objections incident to the construction, operation and maintenance of a leer of this length are believed to be obvious.

In its broad aspect, the present invention contemplates the provision of a process and apparatus whereby a mass of molten glass may be reduced to sheet form at a relatively high rate of speed, and the sheet subsequently annealed while traveling at a relatively slower speed, to the end that there may be achieved with such process and apparatus those advantages incident to the rapid reduction of the molten glass to sheet form and likewise those advantages which result from slower annealing of the glass.

In a somewhat more specific aspect, the invention contemplates the provision of such a process and apparatus wherein a plurality of successive sheets of glass are adapted to be formed at predetermined intervals and at a relatively high rate of speed, each sheet being received as it is formed upon suitable conveying mechanism and carried forwardly at its speed of formation until it has become cooled and set to the desired extent whereupon the speed of travel of the sheet is reduced and the said sheet delivered into an annealing leer through which it is caused to travel intermittently.

The invention further contemplates the provision of such a process and apparatus wherein the speed of travel of the sheets into and through the annealing leer is controlled in such a manner that the forward end of each sheet formed will be relatively closely adjacent the rear end of the preceding sheet as said sheets pass through the annealing leer to the end that the leer may be utilized to its full capacity and thus render possible the elimination of large gaps between adjacent sheets.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through the forward end portion of apparatus constructed in accordance with the present invention, Fig. 2 is a similar view of the rear end portion, and Fig. 3 is a top plan view thereof.

Referring to the drawings, the numeral 10 designates a receiver or support adapted to receive thereupon a mass or charge of molten glass 11 from a pot or receptacle 12. The molten glass is preferably deposited upon the receiver while the same is in a substantially horizontal position as indicated by the broken lines in Fig. 1, after which said receiver is tilted to its full line position so that the molten glass will be moved therefrom between the substantially superimposed sheet forming rolls 13 and 14 and reduced thereby to a sheet 15 of substantially predetermined and uniform thickness.

The glass sheet 15 issuing from between the forming rolls is received upon an inclined runway 16 which functions to guide the sheet downwardly onto a horizontally disposed conveying table 17 which may be termed the cooling section of the apparatus. This cooling section is composed of a plurality of horizontally aligned rolls 18 carried by shafts journaled at their opposite ends in the side members 19 and 20 which are supported at their opposite ends upon standards or supports 21. The rolls 18 of the cooling section are adapted to be driven in unison and this may be accomplished through a chain drive 22 associated with the roll shafts and driven from a motor or the like 23 or in any other desired manner.

Positioned in line with the conveying table 17 is a second conveying table 24 constituting the transfer section of the apparatus. This transfer section is constructed in substantially the same manner as the cooling section 17 and is likewise composed of a plurality of horizontally arranged rolls 25 disposed in horizontal alignment with the rolls 18 of cooling section 17 and being driven by a chain drive 26 operated from a motor 27 or in any other preferred manner.

Arranged at the end of transfer section 24 is an annealing leer 28 within which is mounted a plurality of rolls 29 which constitute the annealing section of the sheet conveying mechanism. The leer rolls 29 are positioned in horizontal alignment with the rolls 18 and 25 of the cooling and transfer sections 17 and 24 respectively and may be driven from a motor 30 through a chain drive 31 or by any other suitable means. From the above, it will be seen that the rolls of the cooling section 17, transfer section 24 and annealing section 29 may be driven independently of one another. According to the invention, the cooling section 17 is adapted to be driven at all times at a constant speed approximately equal to the speed of rolling, the transfer section being driven at the rolling speed and also at a somewhat slower so-called leer speed, while the annealing section is adapted to travel intermittently.

As above pointed out, it is desirable that the glass sheet 15 be formed at a relatively high rate of speed and the forming rolls 13 and 14 are consequently driven in a manner that their peripheral speed will be such that they will function to rapidly reduce the mass of molten glass to sheet form. One of the forming rolls may be positively driven by suitable drive means 32 and the other roll driven from the positively driven roll through intermeshing gears 33 mounted upon the roll shafts.

In carrying the invention into practice, a mass of molten glass 11 is first placed upon the receiver 10 and then moved therefrom to the sheet forming rolls 13 and 14 and reduced thereby to a sheet 15 of substantially predetermined and uniform thickness. The glass is preferably rolled at a relatively high rate of speed say, for example, sixty feet per minute and during the rolling operation, the rolls 18 of cooling section 17 are driven at a speed equal to the speed of sheet formation, namely, sixty feet per minute so as to receive the glass sheet as it is formed and carry the same forwardly. The sheet is adapted to travel over the cooling section 17 and entirely onto the transfer section 24 at rolling speed so that the rolls 25 of transfer section are also being driven at approximately sixty feet per minute during the receiving of the sheet thereupon from the cooling section. After the sheet is entirely received upon the transfer section, the speed of said section is reduced so as to slow down the travel of the sheet to say approximately 20 feet per minute and the sheet is transferred into the leer 28 while traveling at this reduced speed. During the transfer of the sheet into the leer, the leer rolls 29 are of course, adapted to be driven at the same speed as the transfer rolls 25. When the sheet is completely clear of the transfer section 24, the leer rolls 29 are stopped so as to bring the sheet to a standstill and the sheet is maintained stationary until the following sheet has closed the gap between the sheets to the desired extent, whereupon the rolls 29 are again caused to travel at the reduced speed of the transfer rolls to receive the next sheet from the transfer section. In this manner, the glass sheets are caused to travel intermittently through the leer, the glass sheets remaining stationary within the leer during the formation of each succeeding sheet and traveling only during the transfer of each sheet from the transfer section into the annealing leer. Thus, the glass sheets can be formed at a relatively high rate of speed and annealed while traveling at a relatively slower speed. The sheets will remain stationary within the leer for the greater portion of each sheet forming cycle. Also, the gaps between adjacent sheets will be minimized so that the leer may be utilized to its full capacity. The leer speeds given herein are by way of illustration only and the invention is not to be construed as limited thereto since a wide range of speeds may be employed.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The process of producing sheet glass, which consists in reducing a mass of molten glass to sheet form at a substantially predetermined speed, then carrying the sheet forward on a conveyor means arranged in a straight line, reducing the forward movement of the sheet and subjecting the same to annealing conditions, halting the forward movement, forming a second sheet of glass and conveying it toward the first, and then advancing both of said sheets forwardly through the leer and halting the sheets during the formation of each succeeding sheet in the manner set forth.

2. The process of producing sheet glass, which consists in reducing successive masses of molten glass into individual sheets at a substantially predetermined speed, carrying the sheets forwardly through an annealing leer, interrupting the forward movement of the sheets, and holding them stationary during the formation of succeeding sheets so that the sheets are carried in a straight line away from the forming means step by step.

3. The process of producing sheet glass, which consists in reducing successive masses of molten glass into individual sheets at a substantially predetermined speed, conveying the sheets through a roller type leer at a speed less than the forming speed, and in holding the sheets in the leer stationary during the formation of succeeding sheets so that the average speed of the sheet through the leer is relatively less than that of formation.

4. The process of producing sheet glass, which consists in reducing successive masses of molten glass into individual sheets at a substantially predetermined speed, cooling the sheet, passing the sheet onto a transferring mechanism arranged in line with the forming means, reducing the speed of the sheet while on the transfer section, then forwarding the sheet into and through a roller type leer, and periodically halting the forward movement of the sheet through the leer and holding said sheet stationary during the formation of succeeding sheets.

5. The process of producing sheet glass, which consists in reducing successive masses of molten glass into individual sheets at a substantially predetermined speed, cooling the sheet, passing the sheet onto a transferring mechanism arranged in line with the forming means, reducing the speed of the sheet while on the transfer section, then forwarding the sheet into and through a roller type leer, and periodically halting the forward movement of the sheet through the leer and holding said sheet stationary during the formation of succeeding sheets, said sheets being advanced forwardly in the leer only during that time in which a succeeding sheet is being moved from the transfer section into the leer.

6. The process of producing sheet glass, which consists in reducing a mass of molten glass to sheet form at a substantially predetermined speed, reducing the speed of travel of the sheet and transferring it at such reduced speed into an annealing zone, and then alternately moving and stopping the sheet so that it advances through the annealing zone at an average speed relatively less than the transfer speed above mentioned, the sheets in the leer being carried forwardly only during that time that a succeeding sheet is being transferred into the annealing zone.

7. In glass apparatus, means for forming successive sheets of glass, an annealing leer, means for receiving the sheet from the forming means and conveying it into and through said leer, said means including a receiving conveyor, means for driving said conveyor at a constant speed, a transfer conveyor, separate means for driving the transfer conveyor at variable speeds, and an annealing conveyor and individual means therefor for intermittently driving the same.

8. In glass apparatus, means for forming successive sheets of glass, an annealing leer, means for receiving the sheet from the forming means and conveying it into and through said leer, said means including a constant speed receiving conveyor and a variable speed transfer conveyor positioned in line with one another and arranged exteriorly of the leer, and conveying mechanism for carrying the sheet intermittently through said leer.

9. In glass apparatus, means for forming successive sheets of glass, an annealing leer, means for receiving the sheet from the forming means and conveying it into and through said leer, said means including a constant speed receiving conveyor and a variable speed transfer conveyor positioned in line with one another and arranged exteriorly of the leer, and a roller conveyor for advancing the sheet step by step through said leer.

10. In glass apparatus, means for forming successive sheets of glass, an annealing leer, means for receiving the sheet from the forming means and conveying it into and through said leer, said means including a receiving conveyor, means for driving said conveyor at a constant speed equal to the speed of sheet formation, a transfer conveyor for receiving the sheet from a receiving conveyor, variable means for driving the same at a speed equal to the speed of the receiving conveyor and also at a relatively slower speed, a roller conveyor arranged in an annealing section for receiving the sheet from the transfer conveyor, and means for driving the same intermittently so that at one period of the cycle the conveyor is operated at a speed equal to the slow speed of the transfer conveyor and at other times the movement thereof is stopped entirely.

Signed at Toledo, in the county of Lucas and State of Ohio, this 14th day of September, 1929.

JAMES C. BLAIR.